June 17, 1930. F. E. KIMBALL 1,764,210
PROCESS AND APPARATUS FOR CONCENTRATING SULPHURIC ACID
Filed Nov. 9, 1927 2 Sheets-Sheet 1
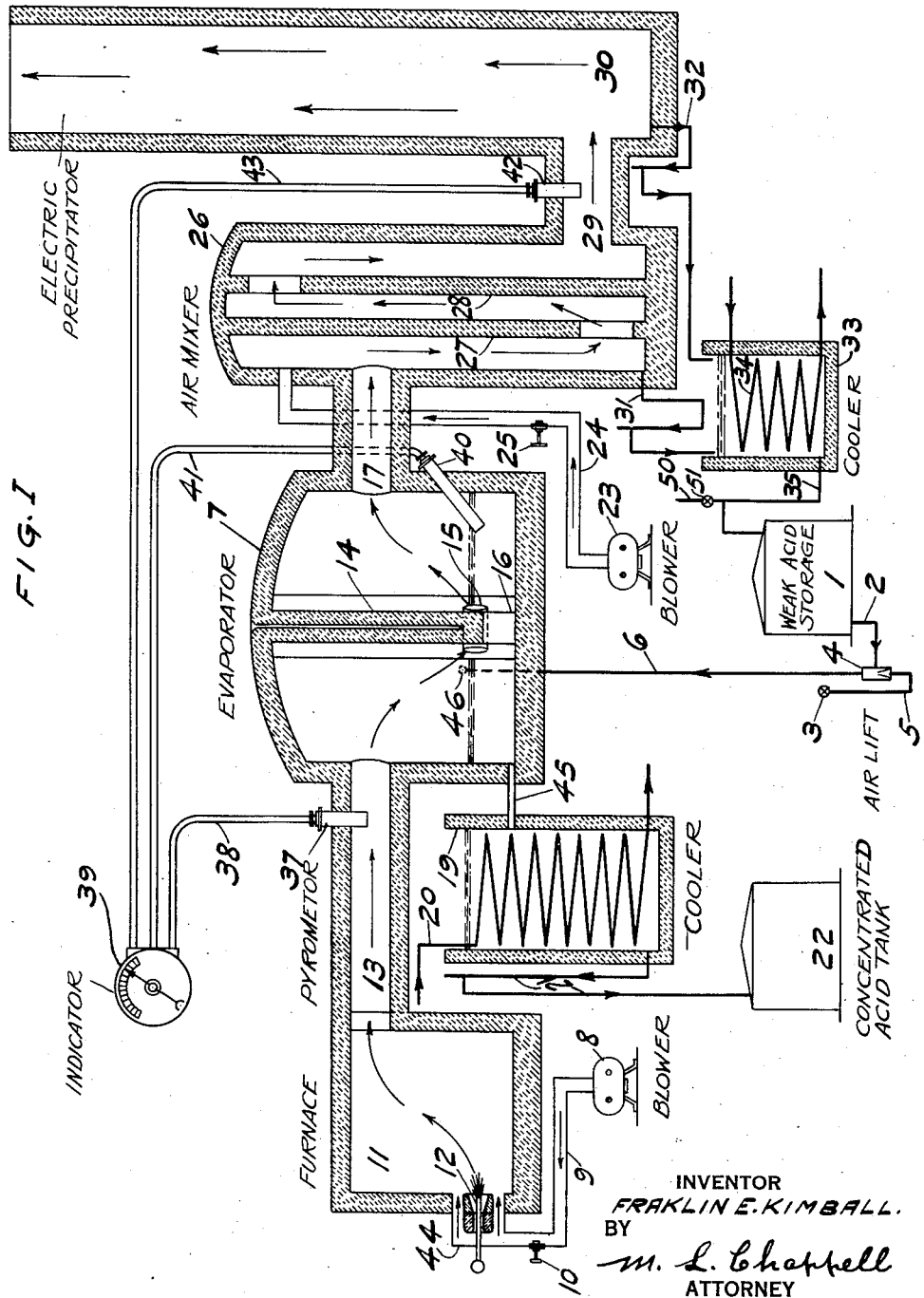

June 17, 1930.　　F. E. KIMBALL　　1,764,210
PROCESS AND APPARATUS FOR CONCENTRATING SULPHURIC ACID
Filed Nov. 9, 1927　　2 Sheets-Sheet 2
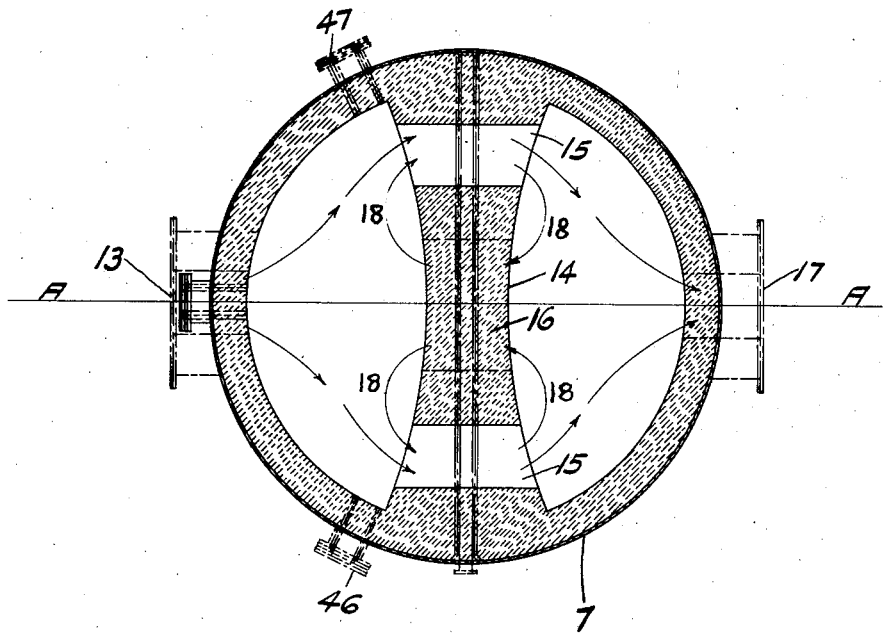
FIG. II
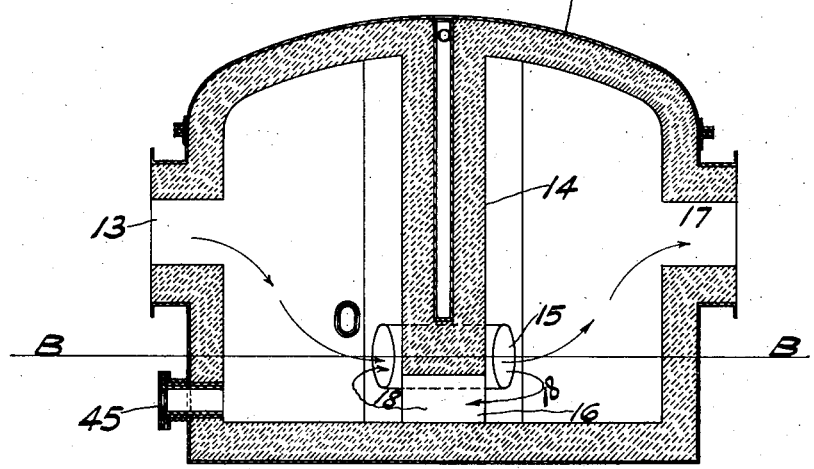
FIG. III
INVENTOR
FRANKLIN E. KIMBALL
BY
M. L. Chappell
ATTORNEY Patented June 17, 1930

1,764,210

UNITED STATES PATENT OFFICE

FRANKLIN E. KIMBALL, OF WATSON, CALIFORNIA

PROCESS AND APPARATUS FOR CONCENTRATING SULPHURIC ACID

Application filed November 9, 1927. Serial No. 232,147.

This invention relates to a process and apparatus for concentrating sulphuric acid, and while not necessarily confined thereto, it more specifically refers to a process and apparatus for concentrating sulphuric acid diluted with water, such as is obtained by the well-known recovery processes of sulphuric acid from acid sludge.

In refining processes of hydrocarbon oils, it is necessary to employ sulphuric acid of various concentrations depending upon the oil treated and the quality of refinement desired. For example, in the refining of gasoline, lamp oil, or lubricating oil distillates, sulphuric acid is employed which may vary in strength from as low as 70 per cent sulphuric acid to as high as 15 per cent fuming sulphuric acid. In such refining processes the major portion of the sulphuric acid employed combines with those hydrocarbons which it is desired to remove, with the concurrent formation of sulpho-acid or sludge. The sulpho-acid or sludge formed by such a refining operation, after separation from the treated oil, is usually subjected to the hydrolytic action of steam, or steam and water under super-atmospheric condition, or by other methods well-known in the art. By such hydrolytic processes the major portion of the sulphuric acid is recovered from the acid sludge containing varying percentages of water and certain small percentages of soluble hydrocarbons in solution.

In order to render the recovered dilute sulphuric acid suitable for re-use, it must be concentrated to the desired strength by the removal of a major part of the water content, in which process usually a large percentage of the soluble hydrocarbons are also removed. During the concentration of this recovered acid by well-known processes, much trouble has been experienced due to foaming, also due to the formation of carbonaceous deposits on the bottom of the concentrating vessel.

I have discovered that this difficulty may be overcome and a satisfactory concentration made by causing a current flow of heated air along with the products of combustion employed to heat the introduced air, to pass over the surface of the acid to be concentrated in such a manner that a circulating turbulent flow of the acid is produced in the concentrating vessel, continuously circulating from one section to the other. I have also discovered that the precipitation of the sulphuric acid mist produced in the evaporator may be facilitated by the introduction of cool air into a chamber provided with baffles, after which the cooled mixture of air and products of combustion containing the remainder of the sulphuric acid mist, is passed through the well-known electric precipitator where the complete separation of the acid is effected and returned to the concentrator.

With the foregoing preliminary explanation the preferred form of our invention will now be more fully explained by reference to the accompanying drawing which is a diagrammatical representation of an apparatus in which the invention may be performed.

In the drawings, Figure 1 represents a diagram of the complete apparatus and Figure 2 is a diagram showing the horizontal and vertical cross-sections of the evaporator.

In the Figure 1, 1 represents generally a storage tank for the weak acid to be concentrated. By the term "weak acid," I mean sulphuric acid containing in excess of 10 per cent by weight of water. A pipe 2 connects the weak acid storage tank 1 to an air lift or ejector 4. A pipe 5 controlled by the valve 3 is connected to the air lift 4, and leads to a source of compressed air not shown. A pipe 6 connects the air lift or ejector to the evaporator 7, terminating in the evaporator designated by the numeral 46. A pipe 35 connects the cooler 33 to the weak acid storage tank 1. A pipe 50, controlled by the valve 51, is connected to the pipe 35, the pipe 50 leading to a source of supply of weak acid not shown. The coil pipe 34 in cooler 33 represents a means of cooling the acid coming from the electric precipitator 30, the said pipe coil 34 entering the cooler 33 and leading to a source of water or other cooling medium not shown; also the terminal pipe of the coil 34 leaving the cooler 33 at the bottom and leading to a source of waste not shown. 8 represents an air compressor or blower for supplying air to the furnace 11 through the pipe 9 controlled by the valve 10. The furnace 11 is provided with a burner 12 which may be constructed in any preferred manner for the burning of oil or gas as desired. The air coming from the blower 8 enters the furnace 11 through the pipes 44 which are situated on each side of the burner 12. The numeral 13 represents a flue for conducting the products of combustion from the furnace 11 to the evaporator 7. Connected into the flue 13 is a pyrometer 37 which is connected to an insulated wire 38 which leads to a temperature indicator 39. The evaporator 7 is provided with a central divisional partition 14 so that the heated air and products of combustion must pass through the passageway 15. 16 represents a passageway for the acid to flow back from the second division into the first division of the evaporator 7. 41 is insulated wire which connects the pyrometer 40 to the temperature indicator 39. 17 is a flue connecting the evaporator 7 to the air mixer 26. The air mixer 26 is provided with baffles 27 and 28. The passageway 29 connects the air mixer 26 to an electrical precipitator 30. An insulated wire 43 connects the pyrometer 32 to the indicator 39. 23 is an air blower for introducing air into the air mixer 26 through the pipe 24 controlled by the valve 25. A pipe 31 connects the air mixer 26 at the bottom to the cooler 33. A pipe 32 connects the electrical precipitator at the bottom to cooler 33. A pipe 45 connects the evaporator 7 at the bottom to a cooler 19. The cooler 19 is provided with a cooling coil 20 which leads to a source of water or other cooling medium not shown. A pipe 21 connects the cooler 19 at the bottom to a concentrated acid tank 22.

Figure 2 represents a horizontal cross-section of the evaporator. Figure 3 represents the vertical cross-section of the evaporator. In the horizontal cross-section of the evaporator Fig. 2, 13 is the inlet for the heated air and products of combustion and 15 is the passageway for the products of combustion and heated air from one compartment to another. 46 and 47 represent passageways for the introduction of the weak acid into the evaporator 7. 17 represents the outlet for the gaseous products. 14 represents the divisional wall of the evaporator 7. In the vertical cross-section of the evaporator Fig. 3, 45 is the outlet for the concentrated acid and 13 is the inlet for the products of combustion. The arrows 18 show the direction of the flow of acid in the evaporator 7, and 15 is the passageway for the acid and products of combustion flowing into the second compartment of the evaporator. 17 is the outlet for the gaseous products containing sulphuric acid mist.

The preferred process as carried out with the apparatus thus described, is as follows:

Weak acid obtained in the recovery of sulphuric acid from acid sludge or from other sources, contained in the storage tank 1 is conducted into the evaporator 7 by means of the air jet lift 4, the rate of introduction being regulated by the rate at which the acid is concentrated. The weak acid passes from the storage tank 1 through the pipe 6 which terminates in the evaporator 7 at 46. Preliminarily the evaporator is filled with concentrated acid. The air blower 8 is operated and the fuel coming through the burner 12 is ignited, the flow of air being regulated so that there will be a complete combustion of the fuel introduced and an excess of air. The quantity of fuel introduced through the burner 12 and the air introduced by the blower 8 is regulated according to the temperature required which is indicated by the pyrometer 37. Preferably a temperature of 800 degrees F. is maintained in the passageway which conducts the products of combustion and air into the evaporator 7. The heated products of combustion and air at a temperature of approximately 800 degreees F. after entering the evaporator 7 pass through the passageway 15, thereby coming into contact with the surface of the acid under concentration, and by maintaining a relatively high velocity of the hot gases, the acid from the first compartment of the evaporator flows along with the products of combustion into the second compartment, from where the acid flows in a downward direction through the lower passageway 16 and back into the first section of the evaporator, thereby producing a turbulent circulation of the acid under concentration, and a rapid evaporation of the water contained therein. The acid under concentration in the evaporator 7 is maintained at a height of approximately 2 to 3 inches from the top of the passageway 15 so that a high velocity of the heated air and products of combustion may be maintained during the passage through the space above the acid. A temperature of approximately 420 degrees F. is maintained in the evaporator which is regulated by the flow of weak acid. As the concentrated acid accumulates, it passes through the cooler 20 and then into the concentrated acid tank 22 by gravity flow. The heated air and products of combustion leaving the evaporator 7 contain a relatively large amount of sulphuric acid mist which must be separated in order to avoid loss of acid. These products pass into the air mixer 26 where cool air is introduced in quantities sufficient to cool the gaseous products containing the sulphuric acid mist to a temperature of approximately 250 degrees F. In the air mixer 26 a portion of the sulphuric acid mist is condensed and separated from the gas. The weak sulphuric acid separated in the air mixer 26 is conducted through the cooler 33 into the weak acid storage tank 1. The amount of air admitted into the air mixer 26 is regulated by valve 25, the quantity being varied so as to maintain an approximate temperature of 250 degrees F. indicated by the pyrometer 42. The amount of air admitted by the valve 3 to acid lift 4 is varied so as to maintain a regulated flow of weak acid into the evaporator 7, this control being governed by the temperature of the acid and indicated by the pyrometer 40. By operating in this manner, and maintaining the acid in the evaporator at a temperature of approximately 420 degrees F., a continuous stream of concentrated acid of the desired strength flows into the tank 22. It is to be understood that by maintaining a higher temperature than 420 degrees F. in the evaporator a concentrated acid of higher strength may be obtained.

While the process herein described is well adapted for carrying out the object of the present invention, it is to be understood that various modifications may be made without departing from the spirit of the invention and the invention includes all such modifications and changes as come within the scope of the appended claims.

What I claim is:

1. A method of concentrating liquids, comprising, causing the liquid to pass from a primary compartment to a secondary compartment through an upper passageway partly filled with the liquid, by blowing hot gases therethrough, above the surface of the liquid, and permitting the liquid to return by gravity flow back to the primary compartment through a lower passageway, introducing dilute liquid into one of said compartments and withdrawing concentrated liquid therefrom.

2. A method of concentrating liquids, comprising, causing the liquid to continuously pass from a primary compartment to a secondary compartment through an upper passageway partly filled with the liquid, by blowing hot gases therethrough above the surface of the liquid and permitting the liquid to continuously return by gravity flow back to the primary compartment through a lower passageway, continuously introducing dilute liquid into one of said compartments and continuously withdrawing concentrated liquid therefrom.

3. A method of concentrating dilute sulphuric acid, comprising, causing the dilute sulphuric acid to continuously pass from a primary compartment to a secondary compartment through an upper passageway partly filled with the sulphuric acid, by blowing hot gases therethrough above the surface of the sulphuric acid and permitting the sulphuric acid to continuously return by gravity flow back to the primary compartment through a lower passageway, continuously introducing dilute sulphuric acid into one of said compartments and continuously withdrawing concentrated sulphuric acid therefrom.

4. A method of concentrating dilute sulphuric acid, comprising, causing the sulphuric acid to continuously pass from a primary compartment to a secondary compartment through an upper passageway partly filled with the sulphuric acid, by blowing hot gases therethrough above the surface of the sulphuric acid and permitting the sulphuric acid to continuously return by gravity flow back to the primary compartment through a lower passageway, continuously introducing dilute sulphuric acid into one of said compartments, continuously withdrawing concentrated sulphuric acid therefrom, continuously withdrawing and cooling the hot gases and products of evaporation from the evaporator, and continuously separating, cooling and returning the dilute sulphuric acid to one of said compartments to be concentrated.

5. A method of concentrating liquids, comprising, causing the liquid in an evaporator to circulate from a primary compartment in said evaporator through an upper passageway partly filled with the liquid, into a secondary compartment in said evaporator and return to the primary compartment through a lower submerged passageway, by causing hot gases from a furnace to pass over the surface of the liquid and through the said upper passageway in quantities and at a temperature sufficient to heat and maintain the circulating liquid at the evaporating temperature, continuously introducing dilute liquid into the evaporator, continuously withdrawing concentrated liquid therefrom, continuously withdrawing and cooling the hot gases and products of evaporation from the evaporator and continuously separating and returning the dilute liquid to the evaporator to be concentrated.

6. An apparatus for concentrating liquids, comprising, an evaporator with a divisional wall extending from the top to the bottom. with means for introducing dilute liquid and means for withdrawing concentrated liquid therefrom, partially submerged passageways through the divisional wall at the level of the concentrating liquid, and completely submerged passageways through the said divisional wall at the lower level, furnace means for passing hot gases into the evaporator and means for conducting the hot gases from the evaporator to a cooler and separating device.

7. In an apparatus for concentrating liquids, an evaporator with a divisional wall extending from the top to the bottom, partially submerged passageways through the divisional wall at the level of the concentrating liquid, and completely submerged passageways through the said divisional wall at a lower level, means for passing hot gases into the evaporator and means for conducting the hot gases from the evaporator to a condenser and electrical precipitator.

In testimony whereof I affix my signature.

FRANKLIN E. KIMBALL.